(12) United States Patent
Edison et al.

(10) Patent No.: US 12,143,389 B1
(45) Date of Patent: Nov. 12, 2024

(54) 3RD PARTY DATA EXPLORER

(71) Applicant: Wells Fargo Bank, N.A., San Francisco, CA (US)

(72) Inventors: Charles Steven Edison, San Francisco, CA (US); Kevin Michael Wurzer, San Francisco, CA (US); Kodzo Wegba, San Francisco, CA (US); James Ellis Bonk, San Francisco, CA (US); James A. Smith, San Francisco, CA (US); Cheng Tcha Vue, San Francisco, CA (US); Paul D. Jacobson, San Francisco, CA (US); Daniel Fricano, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 234 days.

(21) Appl. No.: 17/665,227

(22) Filed: Feb. 4, 2022

(51) Int. Cl.
H04L 9/40 (2022.01)
(52) U.S. Cl.
CPC ........ *H04L 63/102* (2013.01); *H04L 63/0281* (2013.01); *H04L 63/101* (2013.01); *H04L 63/1408* (2013.01)
(58) Field of Classification Search
CPC . H04L 63/102; H04L 63/0281; H04L 63/101; H04L 63/1408
See application file for complete search history.

(56) References Cited

U.S. PATENT DOCUMENTS

| | | | |
|---|---|---|---|
| 6,266,695 B1 * | 7/2001 | Huang | H04L 41/28 709/224 |
| 6,282,546 B1 | 8/2001 | Gleichauf et al. | |
| 7,284,274 B1 | 10/2007 | Walls et al. | |
| 7,676,841 B2 | 3/2010 | Sobchuk et al. | |
| 7,756,989 B2 | 7/2010 | Goldszmidt et al. | |

(Continued)

FOREIGN PATENT DOCUMENTS

| | | |
|---|---|---|
| CA | 111865941 A | 10/2020 |
| CN | 105743880 A | 7/2016 |

(Continued)

OTHER PUBLICATIONS

Allodi & Massacci, "Security Events and Vulnerability Data for Cybersecurity Risk Estimation," Risk Analysis 37(8), pp. 1606-1627 (2017).

(Continued)

*Primary Examiner* — Ghodrat Jamshidi
(74) *Attorney, Agent, or Firm* — Foley & Lardner LLP

(57) ABSTRACT

Systems and methods for managing third party data are provided. A third party data management system includes a processing circuit. The processing circuit is configured to receive first third party activity data from a source computing system and via a cybersecurity correlation and analytics computing system, determine a computing entity external to the third party data management system associated with the third party activity data based on at least one item extracted from the first third party activity data, periodically monitor third party activity associated with the computing entity, comprising operations to collect second third party activity data, and correlate the monitored second third party activity data to an entity profile.

19 Claims, 4 Drawing Sheets

(56) References Cited

U.S. PATENT DOCUMENTS

| | | |
|---|---|---|
| 7,849,507 B1 | 12/2010 | Bloch et al. |
| 7,870,243 B1 | 1/2011 | Aikens et al. |
| 7,983,189 B2 | 7/2011 | Bugenhagen |
| 8,028,066 B2 | 9/2011 | Lewis |
| 8,121,049 B2 | 2/2012 | Lidstrom et al. |
| 8,832,832 B1 | 9/2014 | Visbal |
| 8,856,023 B2 | 10/2014 | Bantz et al. |
| 8,898,784 B1 | 11/2014 | Alexander et al. |
| 9,088,615 B1 | 7/2015 | Avlasov et al. |
| 9,166,999 B1 | 10/2015 | Kulkarni et al. |
| 9,294,498 B1 | 3/2016 | Yampolskiy et al. |
| 9,306,965 B1 | 4/2016 | Grossman et al. |
| 9,392,003 B2 | 7/2016 | Amsler |
| 9,401,851 B2 | 7/2016 | Kakadia et al. |
| 9,401,926 B1 | 7/2016 | Dubow et al. |
| 9,432,389 B1 | 8/2016 | Khalid et al. |
| 9,461,897 B1 | 10/2016 | Babcock et al. |
| 9,686,150 B2 | 6/2017 | Gesmann |
| 9,686,308 B1 | 6/2017 | Srivastava |
| 9,703,851 B2 | 7/2017 | Ramesh et al. |
| 9,742,793 B2 | 8/2017 | Bryant et al. |
| 9,794,145 B2 | 10/2017 | Vasseur et al. |
| 9,811,667 B2 | 11/2017 | Hugard et al. |
| 9,819,626 B1 | 11/2017 | Berg et al. |
| 9,935,865 B2 | 4/2018 | Ganesan et al. |
| 9,973,524 B2 | 5/2018 | Boyer et al. |
| 9,973,892 B1 | 5/2018 | Parshin et al. |
| 10,091,220 B2 | 10/2018 | Shabtai et al. |
| 10,104,109 B2 | 10/2018 | Singla et al. |
| 10,198,581 B2 | 2/2019 | Sreenivas et al. |
| 10,218,736 B2 | 2/2019 | Ng et al. |
| 10,277,619 B1 | 4/2019 | Clark et al. |
| 10,289,973 B2 | 5/2019 | Feller et al. |
| 10,360,525 B1 | 7/2019 | Milden et al. |
| 10,382,491 B2 | 8/2019 | Digiambattista et al. |
| 10,410,158 B1 | 9/2019 | Yumer et al. |
| 10,496,816 B2 | 12/2019 | Iyer et al. |
| 10,498,756 B2 | 12/2019 | Yampolskiy et al. |
| 10,515,328 B2 | 12/2019 | Rasumov |
| 10,530,666 B2 | 1/2020 | Venkitapathi et al. |
| 10,601,854 B2 | 3/2020 | Lokamathe et al. |
| 10,956,849 B2 | 3/2021 | Wu et al. |
| 11,451,572 B2 | 9/2022 | Yampolskiy et al. |
| 11,551,293 B1 | 1/2023 | Soccorsy et al. |
| 11,636,213 B1 | 4/2023 | Elgressy et al. |
| 11,652,828 B1 | 5/2023 | Fricano et al. |
| 11,706,241 B1 | 7/2023 | Cross et al. |
| 11,720,686 B1 | 8/2023 | Cross et al. |
| 2003/0083938 A1* | 5/2003 | Smith .................... H04L 67/535 705/14.66 |
| 2004/0209634 A1* | 10/2004 | Hrastar ................ H04W 12/088 455/515 |
| 2007/0113100 A2 | 5/2007 | Oliphant |
| 2007/0136200 A1 | 6/2007 | Frank et al. |
| 2008/0222283 A1* | 9/2008 | Ertugrul ................ H04L 67/535 709/224 |
| 2009/0193007 A1* | 7/2009 | Mastalli .............. G06F 16/3326 707/999.005 |
| 2010/0082379 A1 | 4/2010 | Chan et al. |
| 2011/0317559 A1 | 12/2011 | Kern et al. |
| 2012/0158944 A1 | 6/2012 | Tiwari et al. |
| 2012/0232948 A1 | 9/2012 | Wolf et al. |
| 2012/0254671 A1 | 10/2012 | Francisco et al. |
| 2012/0304300 A1 | 11/2012 | Labumbard |
| 2013/0041713 A1 | 2/2013 | Henrich et al. |
| 2014/0082739 A1 | 3/2014 | Chess et al. |
| 2014/0115514 A1* | 4/2014 | Hackborn ................. H04W 4/00 715/771 |
| 2014/0181892 A1 | 6/2014 | Von Bokern et al. |
| 2014/0317730 A1 | 10/2014 | Ashley et al. |
| 2015/0033349 A1 | 1/2015 | Oliphant et al. |
| 2015/0134618 A1 | 5/2015 | Teterin et al. |
| 2015/0172204 A1 | 6/2015 | Anderson et al. |
| 2015/0195154 A1 | 7/2015 | Hevizi et al. |
| 2015/0215334 A1 | 7/2015 | Bingham et al. |
| 2015/0281004 A1 | 10/2015 | Kakadia et al. |
| 2016/0171415 A1 | 6/2016 | Yampolskiy et al. |
| 2016/0212176 A1 | 7/2016 | Lango et al. |
| 2016/0248797 A1 | 8/2016 | Yampolskiy et al. |
| 2016/0380843 A1 | 12/2016 | Duncan et al. |
| 2017/0220964 A1 | 8/2017 | Datta Ray |
| 2017/0295181 A1 | 10/2017 | Parimi et al. |
| 2018/0013769 A1 | 1/2018 | Robinson et al. |
| 2018/0032736 A1 | 2/2018 | Inagaki et al. |
| 2018/0048534 A1 | 2/2018 | Banga et al. |
| 2018/0077573 A1* | 3/2018 | Werdell ................ H04W 76/10 |
| 2018/0091558 A1 | 3/2018 | Daugherty et al. |
| 2018/0129989 A1 | 5/2018 | Bowers |
| 2018/0219833 A1 | 8/2018 | Reddy |
| 2018/0295154 A1 | 10/2018 | Crabtree et al. |
| 2018/0352025 A1 | 12/2018 | Anya et al. |
| 2018/0375735 A1 | 12/2018 | Hale |
| 2018/0375892 A1 | 12/2018 | Ganor |
| 2018/0376329 A1* | 12/2018 | Gapastione ....... H04W 12/0431 |
| 2019/0132323 A1* | 5/2019 | Williams .............. H04L 63/083 |
| 2019/0222553 A1 | 7/2019 | Wu et al. |
| 2019/0223125 A1* | 7/2019 | Simon ................ H04W 56/0015 |
| 2019/0253447 A1 | 8/2019 | Sweeney et al. |
| 2019/0268366 A1 | 8/2019 | Zeng et al. |
| 2019/0268377 A1* | 8/2019 | Parry .................. H04L 63/1433 |
| 2019/0306731 A1 | 10/2019 | Raghuramu et al. |
| 2020/0012796 A1 | 1/2020 | Trepagnier et al. |
| 2020/0034762 A1 | 1/2020 | Rasumov |
| 2020/0034763 A1 | 1/2020 | Rasumov |
| 2020/0076835 A1 | 3/2020 | Ladnai et al. |
| 2020/0076853 A1 | 3/2020 | Pandian et al. |
| 2020/0089887 A1 | 3/2020 | Luthra et al. |
| 2020/0092319 A1 | 3/2020 | Spisak et al. |
| 2020/0097880 A1 | 3/2020 | Agarwal et al. |
| 2020/0169477 A1 | 5/2020 | Gottschalk et al. |
| 2020/0195673 A1 | 6/2020 | Lee |
| 2020/0274902 A1 | 8/2020 | Gopal et al. |
| 2020/0287813 A1 | 9/2020 | Kutch et al. |
| 2020/0296136 A1 | 9/2020 | Liu et al. |
| 2020/0311298 A1 | 10/2020 | Dunjic et al. |
| 2020/0394309 A1 | 12/2020 | Angelo et al. |
| 2021/0012288 A1 | 1/2021 | Mroczka |
| 2021/0014252 A1 | 1/2021 | Usher et al. |
| 2021/0035116 A1 | 2/2021 | Berrington et al. |
| 2021/0044611 A1 | 2/2021 | Norrie |
| 2021/0058422 A1 | 2/2021 | Obrecht et al. |
| 2021/0064420 A1 | 3/2021 | Goudarzi et al. |
| 2021/0064758 A1 | 3/2021 | Zettel et al. |
| 2021/0075678 A1 | 3/2021 | Seetharaman et al. |
| 2021/0099454 A1 | 4/2021 | Rahimi et al. |
| 2021/0136089 A1 | 5/2021 | Costea et al. |
| 2021/0176270 A1 | 6/2021 | Yampolskiy et al. |
| 2021/0185565 A1 | 6/2021 | Kalderen et al. |
| 2021/0194851 A1 | 6/2021 | Barton et al. |
| 2021/0203673 A1 | 7/2021 | Dos Santos et al. |
| 2021/0211347 A1 | 7/2021 | Vasseur et al. |
| 2021/0216928 A1 | 7/2021 | O'Toole et al. |
| 2021/0306341 A1 | 9/2021 | Tiwari et al. |
| 2021/0392154 A1 | 12/2021 | Waplington |
| 2022/0012990 A1 | 1/2022 | Tortola et al. |
| 2022/0035905 A1 | 2/2022 | Lu et al. |
| 2022/0150271 A1 | 5/2022 | Shah |
| 2022/0201009 A1 | 6/2022 | Dhoble et al. |
| 2022/0261483 A1 | 8/2022 | Tam et al. |
| 2022/0400131 A1 | 12/2022 | Shao et al. |
| 2023/0087052 A1 | 3/2023 | Korja et al. |
| 2023/0113375 A1 | 4/2023 | Thomas et al. |
| 2023/0153443 A1 | 5/2023 | Coppins et al. |
| 2023/0229785 A1 | 7/2023 | Jurado et al. |
| 2023/0247042 A1 | 8/2023 | Luttwak et al. |
| 2023/0344856 A1 | 10/2023 | Mosko et al. |
| 2023/0388306 A1 | 11/2023 | Kaji et al. |

FOREIGN PATENT DOCUMENTS

| | | |
|---|---|---|
| CN | 110119620 A | 8/2019 |
| CN | 110708296 A | 1/2020 |
| CN | 112419074 A | 2/2021 |

(56) References Cited

FOREIGN PATENT DOCUMENTS

| | | |
|---|---|---|
| CN | 115345401 A | 11/2022 |
| CN | 115994363 A | 4/2023 |
| CN | 116614418 A | 8/2023 |
| CN | 117787714 A | 3/2024 |
| EP | 2 323 429 A2 | 5/2011 |
| EP | 2 985 715 A1 | 2/2016 |
| EP | 3 770 786 A1 | 1/2021 |
| WO | WO-01/59989 A2 | 8/2001 |
| WO | WO-2005/109212 A2 | 11/2005 |
| WO | WO-2007/010541 A2 | 1/2007 |
| WO | WO-2008/103286 A2 | 8/2008 |
| WO | WO-2013/166126 A1 | 11/2013 |
| WO | WO-2017/039506 A2 | 3/2017 |
| WO | WO-2017/081639 A2 | 5/2017 |
| WO | WO-2018/084808 A1 | 5/2018 |
| WO | WO-2018/223235 A1 | 12/2018 |
| WO | WO-2019/075795 A1 | 4/2019 |
| WO | WO-2019/121043 A1 | 6/2019 |
| WO | WO-2019/140876 A1 | 7/2019 |
| WO | WO-2020/060503 A1 | 3/2020 |
| WO | WO-2020/176066 A1 | 9/2020 |
| WO | WO-2020/227335 A1 | 11/2020 |
| WO | WO-2021/081516 A1 | 4/2021 |
| WO | WO-2021/082966 A1 | 5/2021 |
| WO | WO-2021/164872 A1 | 8/2021 |
| WO | WO-2021/183939 A1 | 9/2021 |
| WO | WO-2021/202833 A1 | 10/2021 |
| WO | WO-2021/243321 A1 | 12/2021 |
| WO | WO-2022/087510 A1 | 4/2022 |

OTHER PUBLICATIONS

Tavabi, et al., "Challenges in Forecasting Malicious Events from Incomplete Data," WWW '20: Companion Proceedings of the Web Conference 2020, pp. 603-610 (2020).

Informatica Documentationl; "Key Performance Indicators" 2 pages dated Apr. 22, 2020: https://docs.informatica.com/data-integration/b2b-data-exchange/10-2-2/developer-guide/dashboard-and-reports/key-performance-indicators.html.

Oracle Help Center "Setting up Performance Monitoring" 21 pages 2019.

ScienceLogic; "IT Performance Reporting & Dashboards" dated Apr. 22, 2020 https://sciencelogic.com/solutions/it-infrastructure-monitoring.

SecurityScorecard; "Vendor Security Risk Management" dated Apr. 22, 2020 8 pages https://securityscorecard.com/solutions/third-party-risk-management.

Servicenow; "Service level management PA dashboard" 3 pages https://securityscorecard.com/solutions/third-party-risk-management.

* cited by examiner

Data Explorer# 3RD PARTY DATA EXPLORER

CROSS-REFERENCE TO RELATED PATENT APPLICATIONS

This application is related to and incorporates by reference, in their entireties and for all purposes, each of U.S. patent application Ser. No. 17/081,275, filed Oct. 27, 2020, U.S. patent application Ser. No. 17/129,772, filed Dec. 21, 2020, U.S. patent application Ser. No. 17/129,777, filed Dec. 21, 2020, U.S. patent application Ser. No. 17/129,762, filed Dec. 21, 2020, and U.S. patent application Ser. No. 17/129,801, filed Dec. 21, 2020.

TECHNICAL FIELD

The present disclosure relates generally to computer architecture and software for information security and cybersecurity. Cybersecurity systems and methods utilizing third party entity third party activity data are described. A computer-based information security model utilizing monitoring and correlating connectivity data to an entity profile is also described, as are the related system architecture and software.

BACKGROUND

In a computer networked environment, users and entities, such as people and companies, maintain data in computer systems connected to networks. Furthermore, people and companies may provide various third party entities, such as vendors, access to the connected networks to communicate and share data. The data, systems, and networks are prone to various security vulnerabilities, misconfigurations, and partial implementations, which may lead to cybersecurity vulnerabilities, which, in turn, may lead to cybersecurity attacks. Existing cybersecurity monitoring architectures and software limit insights into security vulnerabilities to a particular data plane, such as network, infrastructure, and/or application-related data, and to particular types of security events associated with the particular data plane. Further, such architectures and software may not efficiently collect and store activity data of the various third party entities in an efficient or effective way, which may prevent people and companies from identifying risks associated with third party entities.

SUMMARY

One example embodiment relates to a third party data management system. The third party data management system includes a processing circuit. The processing circuit is configured to receive first third party activity data from a source computing system and via a cybersecurity correlation and analytics computing system, determine a computing entity external to the third party data management system associated with the third party activity data based on at least one item extracted from the first third party activity data, periodically monitor third party activity associated with the computing entity, comprising operations to collect second third party activity data, and correlate the monitored second third party activity data to an entity profile.

Another example embodiment relates to a method of managing third party data. The method includes receiving, by a processing circuit of a third party data management system, first third party activity data from a source computing system and via a cybersecurity correlation and analytics computing system. The method further includes determining, by the processing circuit of the third party data management system, a computing entity external to the third party data management system associated with the third party activity data based on at least one item extracted from the first third party activity data. The method further includes monitoring, periodically by the processing circuit of the third party data management system, third party activity associated with the computing entity, comprising operations to collect second third party activity data. The method further includes correlating, by the processing circuit of the third party data management system, the monitored second third party activity data to an entity profile.

Yet another example embodiment relates to one or more non-transitory computer readable media storing instructions that, when executed by a processor, causes the processor to perform operations for managing third party data. The operations include receiving, by a processing circuit of a third party data management system, first third party activity data from a source computing system and via a cybersecurity correlation and analytics computing system. The operations further include determining, by the processing circuit of the third party data management system, a computing entity external to the third party data management system associated with the third party activity data based on at least one item extracted from the first third party activity data. The operations further include monitoring, periodically by the processing circuit of the third party data management system, third party activity associated with the computing entity, comprising operations to collect second third party activity data. The operations further include correlating, by the processing circuit of the third party data management system, the monitored second third party activity data to an entity profile.

These and other features, together with the organization and manner of operation thereof, will become apparent from the following detailed description when taken in conjunction with the accompanying drawings.

Figure 1:
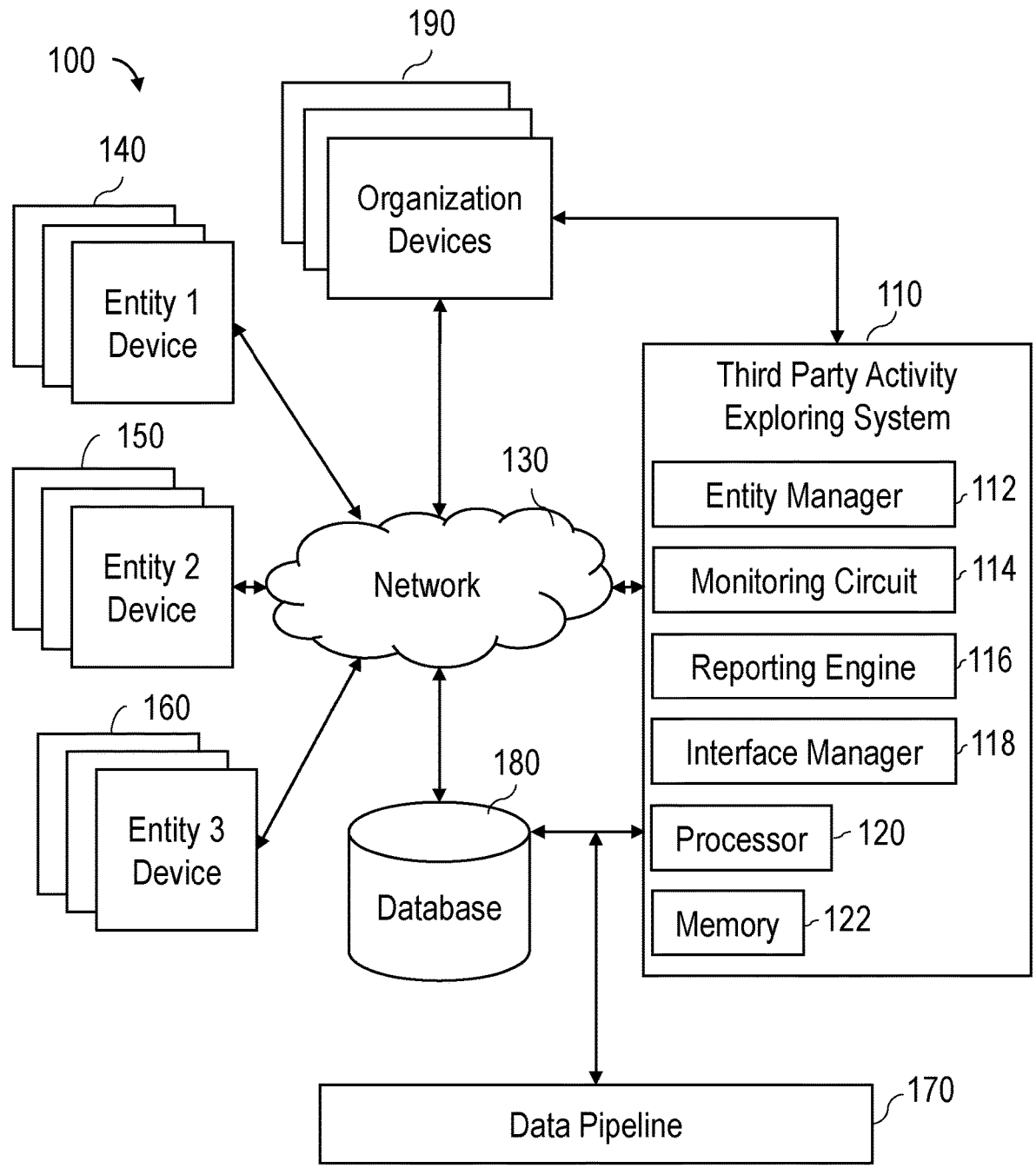
FIG. 1 is block diagram depicting an example of a third party activity exploring system and computing environment, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the Figures, the systems and methods described herein relate generally to detecting, managing, and storing third party entity activity data in a computer network environment. As used herein, the term "third party entity" refers to any individual or company that has access to one or more computer-based systems or networks of a secondary person or company. In some arrangements, the operations of detecting, managing, and storing third party entity activity data described herein are based at least in part on a security model that can include entity data associated with an entity. The security data, which may include third party activity data, software metadata, IP traffic data, etc., can be received from a plurality of data channels and pipelines and can pertain to a plurality of computing devices. In general, entity data can be analyzed to detect cybersecurity vulnerabilities and/or threats such that cybersecurity risk scores can be generated and aggregated to generate a multi-dimensional score. The entity data may be stored in an entity profile.

As used herein, a "cyber-incident" may be any incident where a party (e.g., user, individual, institution, company) gains unauthorized access to perform unauthorized actions in a computer network environment. A cyber-incident may result from a cybersecurity vulnerability. In many systems, cybersecurity vulnerabilities (e.g., malware, unpatched security vulnerabilities, expired certificates, hidden backdoor programs, super-user and/or admin account privileges, remote access policies, other policies and procedures, type and/or lack of encryption, type and/or lack of network segmentation, common injection and parameter manipulation, automated running of scripts, unknown security bugs in software or programming interfaces, social engineering, and IoT devices) can go undetected and unaddressed, leading to hacking activities, data breaches, cyberattacks (e.g., phishing attacks, malware attacks, web attacks, and artificial intelligence (AI)-powered attacks), and other detrimental cyber-incidents.

Accordingly, the ability to avoid and prevent cyber threats, such as hacking activities, data breaches, and cyber-attacks, provides entities and users (e.g., provider, financial institution, individual, and company) improved cybersecurity by periodically (e.g., in real time, once a day, once a week, etc.) monitoring third party activity of a computing entity. In particular, periodically monitoring third party activity (e.g., log activity, access to sensitive data, etc.) can improve the protection of an organization's data by correlating the monitored third party activity to an entity profile. The design and execution of cybersecurity models for detecting and addressing cybersecurity vulnerabilities helps dynamically monitor and discover entity and user relationships (e.g., network relationships, hardware relationships, device relationships and financial relationships) between entities and users. The approach to detecting and monitoring third party third party activity allows cybersecurity models to provide significant improvements to cybersecurity of third party entities and users by improving network security, infrastructure security, technology security, and data security.

Further, monitoring third party activity and mapping the activity to specific entity profiles provides the technical benefit of generating automatic and organized entity behavior reports and associated risks for avoiding and preventing successful hacking activities successful cyberattacks, data breaches, and other detrimental cyber-incidents. As described herein, the systems and methods of the present disclosure may include generating and exposing to the affected systems access-controlled activity data. An additional benefit from automatically generating and quantifying cybersecurity activity data and risks is automated or automatically-assisted triage of weaknesses or unauthorized activity, which optimizes the usage of limited resources to achieve rapid technology risk reduction over a given timeframe and provides an efficient way of automatically monitoring third party activity over a predetermined predefined timeframe.

Entity activity may include encoded information included in network traffic packets and may not be perceptible or easily decodable by a human. Further, even in scenarios where third party entity activity data may be monitored manually, manual tracking and correlating of entity activity is often inaccurate, time consuming and results in incomplete data, which can lead to a larger timeframe for cyber security incidents while an individual or company manually searches for unusual activity. Accordingly, the systems and methods described herein enable efficient, accurate, and easily accessible third party activity data mapped to a specific entity profile. Specifically, the computer-based systems and methods described herein are rooted in computer analysis of third party third party activity data including automatically tracking and correlating activity to an entity profile, which would not be used in tracking third party activity manually as such analysis would be time consuming and ineffective if performed by a human.

As contemplated herein, the "entity profile" may be generated, structured and/or maintained as described in U.S. patent application Ser. No. 17/081,275 (titled "SECURITY MODEL UTILIZING MULTI-CHANNEL DATA WITH VULNERABILITY REMEDIATION CIRCUITRY"), filed Oct. 27, 2020, U.S. patent application Ser. No. 17/129,772 (titled "SECURITY MODEL UTILIZING MULTI-CHANNEL DATA WITH SERVICE LEVEL AGREEMENT INTEGRATION"), filed Dec. 21, 2020, U.S. patent application Ser. No. 17/129,777 (titled "SECURITY MODEL UTILIZING MULTI-CHANNEL DATA WITH RISK-ENTITY FACING CYBERSECURITY ALERT ENGINE AND PORTAL"), filed Dec. 21, 2020, U.S. patent application Ser. No. 17/129,762 (titled "SECURITY MODEL UTILIZING MULTI-CHANNEL DATA"), filed Dec. 21, 2020, and/or U.S. patent application Ser. No. 17/129,801 (titled "SECURITY MODEL UTILIZING MULTI-CHANNEL DATA WITH VULNERABILITY REMEDIATION CIRCUITRY"), filed Dec. 21, 2020. More generally, the term "entity profile" may refer to any suitable implementation of a collection of data regarding an entity.

As used herein, the term "resource" refers to a physical or virtualized (for example, in cloud computing environments) computing resource needed to execute computer-based operations. Examples of computing resources include computing equipment or device (server, router, switch, etc.), storage, memory, executable (application, service, and the like), data file or data set (whether permanently stored or cached), and/or a combination thereof (for example, a set of computer-executable instructions stored in memory and executed by a processor, computer-readable media having data stored thereon).

Various other technical benefits and advantages are described in greater detail below.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

Referring now to FIG. 1, a block diagram depicting an example of a third party third party activity exploring system 110 and a computing environment 100 is shown, according to some arrangements. As shown, the environment 100 comprises the third party third party activity exploring system 110, which includes an entity manager 112, a monitoring circuit 114, a reporting engine 116, and an interface manager 118. The third party activity exploring system 110 can include at least one processor 120 and memory 122 to perform and store various operating instructions described herein. The third party activity exploring system 110 is communicatively coupled, via a database 180 and/or a network 130, to a plurality of third party entity devices (e.g., entity 1 device(s) 140, entity 2 device(s) 150, and entity 3 device(s) 160, which may be referred to as "entity devices" herein). The entity device(s) 140, 150, and 160 may initiate and/or route (e.g., provide) third party activity data, which may include device connectivity data, log data, IP traffic data, and other types of data, such as additional intelligence data that one or more components of the third party third party activity exploring system 110 may be configured to track, monitor, correlate, and store in an entity profile database. By way of non-limiting example, the computing environment 100 is shown to include a plurality of organization (e.g., the institution) devices 190 communicatively coupled to the third party activity exploring system 110 to access and/or control operation of the various components of the third party activity exploring system 110. The computing environment 100 is shown to include a data pipeline 170 communicatively coupled to the third party activity exploring system 110 and the database 180.

In general, one or more processing circuits included in the various systems described herein can include a microprocessor, an application specific integrated circuit (ASIC), a field-programmable gate array (FPGA), or combinations thereof. A memory can include electronic, optical, magnetic, or any other storage or transmission device capable of providing the processor with program instructions stored in the memory. Instructions can include executable code from any suitable computer programming language. The memory may store machine instructions that, when executed by the processing circuit, cause the processing circuit to perform one or more of the operations described herein. The memory may also store parameter data to affect presentation of one or more resources, animated content items, etc. on the computing device. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which a processor can read instructions. The instructions may include code from any suitable computer programming language such as ActionScript®, C, C++, C #, Java®, JavaScript®, JSON, Perl®, HTML, HTML5, XML, Python®, and Visual Basic®.

The operations described in this disclosure can be implemented as operations performed by a data processing apparatus on data stored on one or more computer-readable storage devices or received from other sources. The terms "data processing system" or "processor" encompass all kinds of apparata, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross platform runtime environment, a virtual machine, or a combination of one or more of them. The apparatus and execution environment can include various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A computer program can be stored in a portion of a file that holds other programs or data (e.g., one or more scripts stored in a markup language document), in a single file dedicated to the program in question, or in multiple coordinated files (e.g., files that store one or more subsystems, sub-programs, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform actions by operating on input data and generating output.

In some arrangements, one or more processing circuits can be configured to load instructions from the main memory (or from data storage) into cache memory. Furthermore, the one or more processing circuits can be configured to load instructions from cache memory into onboard registers and execute instructions from the onboard registers. In some implementations, instructions are encoded in and read from a read-only memory (ROM) or from a firmware memory chip (e.g., storing instructions for a Basic I/O System (BIOS)).

The one or more processing circuits can be connected to the cache memory. However, in some implementations, the cache memory can be integrated into the one or more processing circuits and/or implemented on the same circuit or chip as the one or more processing circuits. Some implementations include multiple layers or levels of cache memory, each further removed from the one or more processing circuits. Some implementations include multiple processing circuits and/or coprocessors that augment the one or more processing circuits with support for additional specialized instructions (e.g., a math coprocessor, a floating point coprocessor, and/or a graphics coprocessor). The coprocessor can be closely connected to the one or more processing circuits. However, in some arrangements, the coprocessor is integrated into the one or more processing circuits or implemented on the same circuit or chip as the one or more processing circuits. In some implementations, the coprocessor is further removed from the one or more processing circuits, e.g., connected to a bus. Details regarding processing circuits, memory, and instructions are further explained in detail with reference to FIG. 3.

The computing system can include clients and servers. A client and server are generally remote from each other and typically interact through a communication network. The relationship of client and server arises by virtue of computer programs running on the respective computers and having a client-server relationship to each other. In some arrangements, a server transmits data (e.g., an HTML page) to a client device (e.g., for purposes of displaying data to and receiving user input from a user interacting with the client device). Data generated at the client device (e.g., a result of the user interaction) can be received from the client device at the server.

To provide for interaction with a user, arrangements of the subject matter described in this specification can be carried out using a computer having a display device, e.g., a quantum dot display (QLED), organic light-emitting diode (OLED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile input, or other biometric information. In addition, a computer can interact with a user by electronically transmitting documents to and receiving documents from a device that is used by the user; for example, by electronically transmitting web pages to a web browser on a user's client device in response to requests received from the web browser.

Further referring to the components of FIG. 1, one or more of the entity device(s) 140, 150, and 160 may be used by a third party entity to perform various actions and/or access various types of data, some of which may be provided over a network 130 (e.g., the Internet, LAN, WAN). As defined herein, the term "third party" includes an entity external to an organization. In some arrangements, the entity may be a known entity, such as a business partner entity (e.g., vendor, supplier, collaborator, etc.). In some arrangements, the third party entities can include an organization's (e.g., one or more entities of the organization devices 190) partner institutions and/or vendors. The third party devices 140, 150, and 160 may be used to electronically transmit data (e.g., entity data) to the third party activity exploring system 110 and/or other components of the computing environment 100. For example, a third party entity can be a statement printing vendor of a financial institution that has access to the financial institution's internal network 130. In another example, a third party entity could be a credit scoring data vendor of a financial institution. In another example, a third party entity can be a technology vendor of a financial institution. In yet another example, a third party entity can be an individual employee of a vendor or cooperating organization of a financial institution (e.g., any user outside of the financial institution with access to the network 130). In some arrangements, the entity may be an unknown entity. In such scenarios, the systems, methods and non-transitory computer-readable media described herein may be operable to identify the new, unknown entity, log the appropriate entity identifier(s) (i.e., domain identifier, subdomain identifier, email address, file name, IP address, etc.) and initiate periodic monitoring of third party activity associated with the new entity. In some arrangements, the network 130 may include shared network resources of a company or organization (e.g., provided by an institution) in which each third party entity of the entity device(s) 140, 150, and 160 may access. For instance, the entity device(s) 140, 150, and 160 may access the network 130 via a proxy server, an email server, an extranet, a firewall, an endpoint that provides security-controlled applications and/or services (such as web services) to the third party, etc. The entity device(s) 140, 150, and 160 may be used by entity users to electronically transmit data (e.g., entity data) via the network 130. For example, the provider institution may provide an extranet to a particular third party entity. The extranet may be accessible by third party entity users and may include security-controlled applications, such as email. In another example, the provider institution may provide a security controlled endpoint (e.g., a URL) that allows a particular third party to access a web-based application, download data files, upload data files, configure application programming interface (API) functionality to invoke computer-executable code packages provided and/or maintained by the institution, etc.

The third party activity data is made available to the third party activity exploring system 110 via the organization's network 130. To that end, the organization devices 190 can be used access to various components of the third party activity exploring system 110 and the network 130 (e.g., using an Internet browser), cybersecurity risk scores, and user-interactive graphical interfaces (e.g., security dashboard), and/or to receive any other type of data. In one example, a user associated with an organization device 190 of the institution (e.g., the institution that provides the network 130 for the entity devices 140, 150, 160) can perform and execute instructions on the third party activity exploring system 110. In various arrangements, the entity can use the systems and methods of the present disclosure to monitor each entity of the plurality of entity devices 140, 150, and 160. In some arrangements, one or more of the organization devices 190 can host a cybersecurity correlation and analytics (CSCA) computing system, such as the CSCA computing system 230 described in reference to FIG. 2. Generally, in such arrangements, the organization device (s) 190 may include circuitry that enables computer-based operations for cybersecurity correlation and analytics, including, for example, ingestion of log data for various source systems, determining various third party activity data items based on the log data, and streaming the log data to the third party activity exploring system 110.

Further with respect to the components of FIG. 1, the network 130 may include a local area network (LAN), a wide area network (WAN), a telephone network, such as the Public Switched Telephone Network (PSTN), a wireless link, an intranet, the Internet, or combinations thereof. The computing environment 100 can also include at least one data processing system or processing circuit, such as entity devices 140, 150, and 160 and/or the third party activity exploring system 110 (e.g., shown as processor 120 and memory 122). Third party activity exploring system 110 can communicate via the network 130, for example with database 180, data pipeline 170, and/or entity device(s) 140, 150, and 160.

The network 130 can enable communication between various nodes, such as the third party activity exploring system 110 and entity devices 140, 150, and 160. In some arrangements, data flows through the network 130 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 130 layered over an OSI layer-3 network protocol such as Internet Protocol (IP), e.g., IPv4 or IPv6. The network 130 is composed of various network devices (nodes) communicatively linked to form one or more data communication paths between participating devices. Each networked device includes at least one network interface for receiving and/or transmitting data, typically as one or more data packets. An illustrative network 130 is the Internet; however, other networks may be used. The network 130 may be an autonomous system (AS), i.e., a network that is operated under a consistent unified routing policy (or at least appears to from outside the AS network) and is generally managed by a single administrative entity (e.g., a system operator, administrator, or administrative group).

The network 130 may be composed of multiple connected sub-networks or AS networks, which may meet at one or more of: an intervening network (a transit network), a dual-homed gateway node, a point of presence (POP), an Internet eXchange Point (IXP), and/or additional other network boundaries. The network 130 can be a local-area network (LAN) such as a company intranet, a metropolitan area network (MAN), a wide area network (WAN), an inter network such as the Internet, or a peer-to-peer network, e.g., an ad hoc Wi-Fi peer-to-peer network. The data links between nodes in the network 130 may be any combination of physical links (e.g., fiber optic, mesh, coaxial, twisted-pair such as Cat-5 or Cat-6, etc.) and/or wireless links (e.g., radio, satellite, microwave, etc.).

The network 130 can include carrier networks for mobile communication devices, e.g., networks implementing wireless communication protocols such as the Global System for Mobile Communications (GSM), Code Division Multiple Access (CDMA), Time Division Synchronous Code Division Multiple Access (TD-SCDMA), Long-Term Evolution (LTE), or any other such protocol including so-called generation 3G, 4G, 5G, and 6G protocols. The network 130 can include short-range wireless links, e.g., via Wi-Fi, BLUETOOTH, BLE, or ZIGBEE, sometimes referred to as a personal area network (PAN) or mesh network. The network 130 may be public, private, or a combination of public and private networks. The network 130 may be any type and/or form of data network and/or communication network.

The network 130 can include a network interface controller that can manage data exchanges with devices in the network 130 (e.g., the organization devices 190) via a network interface (sometimes referred to as a network interface port). The network interface controller handles the physical and data link layers of the Open Systems Interconnection (OSI) model for network communication. In some arrangements, some of the network interface controller's tasks are handled by one or more processing circuits. In various arrangements, the network interface controller is incorporated into the one or more processing circuits, e.g., as circuitry on the same chip.

In some arrangements, the network interface controller supports wireless network connections and an interface is a wireless (e.g., radio) receiver/transmitter (e.g., for any of the IEEE 802.11 Wi-Fi protocols, near field communication (NFC), BLUETOOTH, BLUETOOTH LOW ENERGY (BLE), ZIGBEE, ANT, or any other wireless protocol). In various arrangements, the network interface controller implements one or more network protocols such as Ethernet. Generally, the third party activity exploring system 110 can be configured to exchange data with other computing devices via physical or wireless links through a network interface. The network interface may link directly to another device or to another device via an intermediary device, e.g., a network device such as a hub, a bridge, a switch, or a router, connecting the third party activity exploring system 110 to the network 130.

Expanding generally on network traffic and packets, the various computing devices described herein (e.g., 140, 150, 160, 190) can originate and/or transmit traffic to the computing environment 100 and third party activity exploring system 110, via the network 130. The term "traffic" generally refers to data communications between the computing devices and one or more components of the computing environment 100 shown in FIG. 1. For example, a device (e.g., organization device 190) may submit requests to access various resources (e.g., applications, webpages, services, operating system management-related executables, file system management-related executables, system configuration-related executables) on a host within the computing environment 100 of FIG. 1. In another example, a user device can generate and/or transmit third party activity data. Further, in an example arrangement described herein, a first device is a user device and a second device is a production host, such as an application server, a mail server, etc. The flow of traffic via the network 130 is multi-directional such that the first device may receive return traffic originated by the second device. The return traffic to the first device via the network 130 may include data responsive to user requests to access the resources on the respective computing system (e.g., on the second device).

Network traffic can be segmented into packets. Each packet is a formatted unit for the data and routing instructions carried via the network 130. As used herein, the term "packet" may refer to formatted units at various levels of the OSI networking and/or TCP/IP models, such that the terms "packet", "IP packet", "segment", "datagram", and "frame" may be used interchangeably. As used herein, the term "packet" can be used to denote monitored network traffic generated by a particular device associated with a monitored entity. However, one of skill will appreciate that information received and transmitted by the computing environment 100 and also be encoded in packets, such as TCP/IP packets.

An example packet includes a header, a footer, and a payload. In some arrangements, packets may also include metadata, which may include further routing information. For example, in some arrangements, packets may be routed via a software-defined networking switch, which may include in the packet further information (metadata) containing routing information for the software-defined networking environment. For example, in addition to a payload, application-layer and/or link-layer in an example packet, may contain a header and/or footer that may include a source address of the sending host (e.g., a user device), destination address of the target host, a source port, a destination port, a checksum or other error detection and correction information, packet priority, traffic class, and/or type of service (ToS), packet length, etc. In arrangements where the network 130 comprises one or more virtual local area networks (VLANs), such that, for example, the various computing devices are on different VLANs, the packet may also contain a VLAN identifier.

Any of the foregoing items in the packet can describe, at least in part, activity in a networked environment. In some arrangements, at least some of the foregoing items may be included in third party activity data received via a search or discovery engine for Internet-connected devices, as described further herein. For example, an IP packet can include a host address (e.g., IP address) and/or a port number. Third party activity data provided by a search or discovery engine for Internet-connected devices, can likewise include a property populated with an IP address assigned to a particular device and a port number assigned to a particular software application running on the device in addition to including further information.

Accordingly, any suitable packet and/or third party activity data may be used by the third party activity exploring system 110 to identify vulnerabilities in the associated systems (e.g., at the source system identified by the packet, at the destination system identified by the packet). For example, a header, a footer, and/or metadata of a packet may include routing information for the packet. As used herein, "routing information" is defined as source and/or destination information. For instance, in some arrangements, packet includes application-layer level routing information, such as HTTP routing information, TLS routing information, SSL routing information, SMTP routing information, etc. In some arrangements, packet includes transport and/or Internet-link level routing information, such as one or more routing identifiers specific to the TCP, UDP, SCTP, ICPMv4, ICMPv6 protocols, etc. In some arrangements, packet includes data link-layer routing information, such as a source MAC address, destination MAC address, VLAN ID, VLAN priority, etc. In the arrangement of FIG. 1, each packet also contains a payload (e.g., data carried on behalf of an application) encapsulated with routing information. As described further herein, various vulnerabilities may be associated with these various segments of data from particular packets.

Further with respect to the components of FIG. 1, the entity manager 112 may be configured to receive third party activity data from a source (e.g., from one or more source systems 210 described in reference to FIG. 2 below). For example, the entity manager 112 may be configured to receive third party activity data including, but not limited to, web and/or proxy data, email data, endpoint data, VPN data, firewall data, and/or extranet data from one or more third party entities of the entity devices 140, 150, 160. The proxy data may include web requests, Internet activity, or the like from one or more servers (e.g., such as a proxy server 212 shown in FIG. 2 and discussed in greater detail below). The email data may include sent and/or transmitted email activity of a user (e.g., email sent to/from an entity device 140, 150, and 160 via the network 130) from one or more servers (e.g., such as an email server 214 shown in FIG. 2 and discussed in greater detail below). The endpoint data may include various third party activity from an endpoint of the network 130 including activity of the entity devices 140, 150, 160 (e.g., laptops, desktops, mobile phones, tablets, servers, and/or virtual environments) from one or more servers (e.g., such as an endpoint 216 shown in FIG. 2 and discussed in greater detail below). The VPN data may include data from a virtual private network (VPN) of a third party using one of the entity devices 140, 150, 160, such as a VPN traffic between one or more entity devices and the network 130 through one or more servers (e.g., such as a network server 218 shown in FIG. 2 and discussed below). The firewall data may include any data corresponding to a firewall monitoring and/or controlling incoming and/or outgoing network 130 traffic to or from one or more of the entity devices from one or more servers (e.g., from a firewall server 220 shown in FIG. 2 and discussed below). The extranet data may include any third party activity corresponding to traffic of one or more extranets provided by the organization (e.g., the financial institution, via the organization devices 190) from one or more servers (e.g., from an extranet server 222 shown in FIG. 2 and discussed below).

The entity manager 112 may include one or more systems (e.g., computer-readable instructions executable by a processor) and/or circuits (e.g., ASICs, Processor Memory combinations, logic circuits) configured to perform various functions of the entity manager 112. The entity manager 112 can be run or otherwise be executed on one or more processors of a computing device, such as those described below in FIG. 3.

Various properties (e.g., records, delimited values, values that follow particular pre-determined character-based labels) can be extracted from the third party activity data from the source systems 210 described herein. The properties can include device-related data and/or IP traffic data. Device-related data can encompass data related to software, firmware, and/or hardware technology deployed to, included in, or coupled to a particular device. Device-related data can include IP address(es), software information, operating system information, component designation (e.g., router, web server), version information, port number(s), timestamp data, host name, etc. IP traffic data can include items included in packets, as described elsewhere herein. Further, IP traffic data included in the third party activity data can include various supplemental information (e.g., in some arrangements, metadata associated with packets), such as host name, organization, Internet Service Provider information, country, city, communication protocol information, and Autonomous System Number (ASN) or similar identifier for a group of devices using a particular defined external routing policy. In some arrangements, third party activity data can be determined at least in part based on banner data exposed by the respective source entity. For example, third party activity data can comprise metadata about software running on a particular device of a source entity.

In some arrangements, the entity manager 112 may be configured to receive the connectivity data in real-time such that one or more components of the third party activity exploring system 110 can monitor the data in real-time. In various arrangements, the entity manager 112 may receive the connectivity data in periodic increments such that one or more components of the third party activity exploring system 110 can monitor and/or correlate the data associated with the specific entity periodically (e.g., every second, every minute, every hour, every day, every week). For example, the entity manager 112 may be configured to extract the third party activity data from the source systems 210. The entity manager 112 may be configured to determine, based on the extracted third party activity data, a computing entity external to the third party activity exploring system 110. For example, based on the extracted connectivity data, the entity manager 112 may be configured to determine a corresponding third party entity associated with the third party activity data (e.g., a corresponding vendor, company, or other third party entity associated with the extracted connectivity data).

By way of non-limiting example, the organization associated with the organization devices 190 and the organization network 130 may be a financial institution and a third party entity may be an individual employee of a vendor (e.g., a business consulting firm) of the financial institution that has access to an extranet provided by the financial institution. The third party entity may spend, for example, three hours a day entering data into a provided extranet through the organization network 130. The entity manager 112 may be configured to receive, through one or more components of the data pipeline 170 described in greater detail below, the third party activity data associated with the third party entity, such as how long the employee accesses the extranet, requests submitted via the extranet, and/or various other similar behaviors. The entity manager 112 may be configured to extract the connectivity data and determine, based on the extracted data, a corresponding computing device (e.g., entity devices 140, 150, 160) associated with a third party entity (e.g., such as the vender company and/or the individual employee). In various arrangements, the entity manager 112 may be configured to determine an associated computing device through a plurality of ways including the associated IP domain information received from each source system 210 described below and/or an associated unique identifier associated with the third party activity data (e.g., a cookie, unique code, IP address, etc.) As described in greater detail below, one or more components of the third party activity exploring system 110 may further be configured to monitor such activity and correlate the activity to an entity profile to automatically store, generate and/or update the entity profile to a user of the organization devices 190.

As another non-limiting example, the organization associated with the organization devices 190 and the organization network 130 may similarly be a financial institution and a third party entity may be a vendor (e.g., a business consulting firm) of the financial institution that has access to an extranet provided by the financial institution. A ransomware attack may occur through a VPN associated with the third party entity through the organization network 130. The entity manager 112 may be configured to receive, through one or more components of the data pipeline 170 described in greater detail below, the third party activity data associated with the third party entity, such as which employees of the third party entity have access to the VPN, who is accessing tools of the VPN and/or various other similar behaviors. The entity manager 112 may be configured to extract the connectivity data and determine, based on the extracted data, a corresponding computing device (e.g., entity devices 140, 150, 160) associated with a third party entity (e.g., such as the vender company and/or an individual employee). In various arrangements, the entity manager 112 may be configured to determine an associated computing device through a plurality of ways including the associated IP domain information received from each source system 210 described below and/or an associated unique identifier associated with the third party activity data (e.g., a cookie, unique code, IP address, etc.) As described in greater detail below, one or more components of the third party activity exploring system 110 may further be configured to monitor such activity and correlate the activity to an entity profile to automatically store and generate the entity profile to a user of the organization devices 190. In some arrangements, one or more components of the third party activity exploring system 110 described herein may be configured to generate and render a report to one or more organization devices 190 including a list of all hosts that have connected to the VPN and shut the hosts down immediately (e.g., remove access, etc.).

Further with respect to the components of FIG. 1, a monitoring circuit 114 may be configured to monitor the third party activity of the computing entity (e.g., one of the entity devices 140, 150, 160). The monitoring circuit 114 may include one or more systems (e.g., computer-readable instructions executable by a processor) and/or circuits (e.g., ASICs, Processor Memory combinations, logic circuits) configured to perform various functions of the monitoring circuit 114. The monitoring circuit 114 can be run or otherwise be executed on one or more processors of a computing device, such as those described below in FIG. 3. In some arrangements, the monitoring circuit 114 may be configured to monitor the connectivity data in real-time or in increments (e.g., every second, every minute, every hour, every day, every week). Monitoring the connectivity data in real-time or in increments as described herein may provide various improvements over existing systems. For example, if the connectivity data were monitored by a human, it would typically take multiple people to monitor a single individual and/or entity. Further, it would typically take significantly longer to correlate each activity of an individual to a particular third party entity and store the data in an entity profile. Even existing computer-based systems typically do not continuously monitor, correlate, and store such third party activity, as most existing systems may take weeks or months to monitor and correlate the data to an entity. However, the present solution provides an institution access to each and every third party activity of the network 130 in real-time and/or in short increments (e.g., daily, weekly). This improves the functioning of computing devices by providing immediate and accurate access to all third party entity data to easily track and stop a cyber-attack.

The monitoring circuit 114 may be configured to correlate the monitored third party activity to an entity profile. For example, the monitoring circuit 114 may be configured to map each third party activity to an individual third party entity profile (e.g., an individual and/or a vendor company) stored in the database 180. In some arrangements, the database 180 can be a system of record (SOR) or a source system of record (SSoR) external to the third party activity exploring system 110. For example, the SOR may be configured to maintain records or data relating to each entity profile of the third party activity exploring system 110. In some arrangements, the SOR may include a microservice backend communicatively coupled to a database 180 or other data structure. The microservice backend may be configured to ingest, analyze, process, or otherwise extract data received via entity manager 112 (e.g., via the data pipeline 170 described herein). The SOR may include a plurality of data points associated with a plurality of third party entities. For example, the SOR may include various entity profiles of various third party entities including the logged third party activity data for each entity. The microservice backend may be configured to populate the database 180 with data for each entity profile (such as data relating connectivity data).

In some arrangements, the database 180 may be a component of the third party activity exploring system 110. The third party entity profiles can be further divided into third party entity specific organization and categories (e.g., line-of-business, subsidiary, department, location).

Further with respect to the components of FIG. 1, a reporting engine 116 may be configured to generate, based on the individual third party entity profile, a report including the detailed third party activity correlated to the individual third party entity profile. The reporting engine 116 may include one or more systems (e.g., computer-readable instructions executable by a processor) and/or circuits (e.g., ASICs, Processor Memory combinations, logic circuits) configured to perform various functions of the reporting engine 116. The reporting engine 116 can be run or otherwise be executed on one or more processors of a computing device, such as those described below in FIG. 2.

In various arrangements, the reporting engine 116 may be configured to provide notifications, messages, and/or mass data packets to the users of the organization devices 190 based on the correlated entity third party activity data. For example, in some arrangements, the reporting engine 116 may be configured to access one or more entity profiles and transmit the one or more entity profiles to the organization devices 190. In some arrangement, the report may include a detailed report of the entity profiles including each logged third party activity data, remediation items, historical data, and/or trends in the data. The detailed report can contain various data based on the analyses performed by the one or more processing circuits of the third party activity exploring system 110. The detailed report can include cybersecurity risk scores (e.g., intelligence, perimeter, technology, security controls determined by a risk-scoring process, such as the process described in U.S. patent application Ser. No. 17/129,772 titled "Security Model Utilizing Multi-Channel Data with Service Level Agreement Integration" filed Dec. 21, 2020), multi-dimensional scores, remediation items, remediation actions, security reports, data analytics, graphs, charts, historical data, historical trends, vulnerabilities, summaries, help information, domain information, subdomain information, and/or any other properties extracted from third party activity data, IP traffic data, etc. In various arrangements, the detailed report may be presented on a computer device (e.g., mobile phone screen, monitor, display, smart watch, smart device). The information can be grouped, filtered and/or sorted via various characteristics, including line-of-business, relationship-type, business function, criticality, geographic footprint, and relationship-owner, as stored in each entity profile.

Further with respect to the components of FIG. 1, an interface manager 118 may be configured to render, on one or more of the organization devices 190, a graphical user interface including the report generated by the reporting engine 116. The reporting engine 116 may include one or more systems (e.g., computer-readable instructions executable by a processor) and/or circuits (e.g., ASICs, Processor Memory combinations, logic circuits) configured to perform various functions of the interface manager 118. The interface manager 118 can be run or otherwise be executed on one or more processors of a computing device, such as those described below in FIG. 2.

Generally, a user-interactive interface can be rendered at the any one or more of the organization devices 190 to facilitate interactions and analyze various entity profile data (e.g., cybersecurity risk scores, performance metrics, trends, tracking, remediation items, associated with one or more entity profiles). In various arrangements, the user-interactive interface can be generated, updated and/or monitored by interface manager 118. In various arrangements, the user-interactive interface can display (e.g., via one or more of the organization devices 190) the periodically and/or incrementally logged third party activity data. By way of non-limiting example, a user of the organization devices 190 can see, via the interface generated by the interface manager 118, a day-by-day and/or week-by-week analysis showing third party activity data of a single user of a third party entity including what tools and/or websites the user interacts with on a daily and/or weekly basis, how much data the user sends (e.g., sent/received emails, etc.) on a daily and/or weekly basis, which line of business the user works with (e.g., particular company of the user, particular task force within the financial institution, etc.)

The user-interactive interface can execute at third party activity exploring system 110 and/or the organization devices 190 to provide the user-interactive interface. In some arrangements, the user-interactive interface can be provided within a web browser. In various arrangements, the third party activity exploring system 110 executes to provide the user-interactive interface at the organization computing device 190 without utilizing the web browser.

In some implementations, one or more client devices, e.g., instances of entity devices 140, 150, and 160, and/or organization devices 190, are in communication with a particular database management system (DBMS) or data storage vault, e.g., via a direct link or via the network 130. In some implementations, one or more clients obtain data from the DBMS using queries in a formal query language such as Structured Query Language (SQL), Hyper Text Structured Query Language (HTSQL), Contextual Query Language (CQL), Data Mining Extensions (DMX), or XML Query (XQuery). In some implementations, one or more clients obtain data from the DBMS using an inter-process communication architecture such as the Common Object Request Broker Architecture (CORBA), Remote Procedure Calls (RPC), Object Linking and Embedding (OLE), Component Object Model (COM), or Distributed Component Object Model (DCOM). In some implementations, one or more clients obtain data from the DBMS using natural language or semantic queries. In some implementations, one or more clients obtain data from the DBMS using queries in a custom query language such as a Visualization API Query Language. Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, e.g., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium is tangible. The computer storage medium stores data, e.g., computer executable instructions, in a non-transitory form.

The third party activity exploring system 110 may be used by institutions to assess and manage multidimensional cybersecurity schemas and information (e.g., perimeter, technology, intelligence, and security controls) relating to entities. The assessment can be accomplished using various components of the third party activity exploring system as described further herein.

Figure 2:
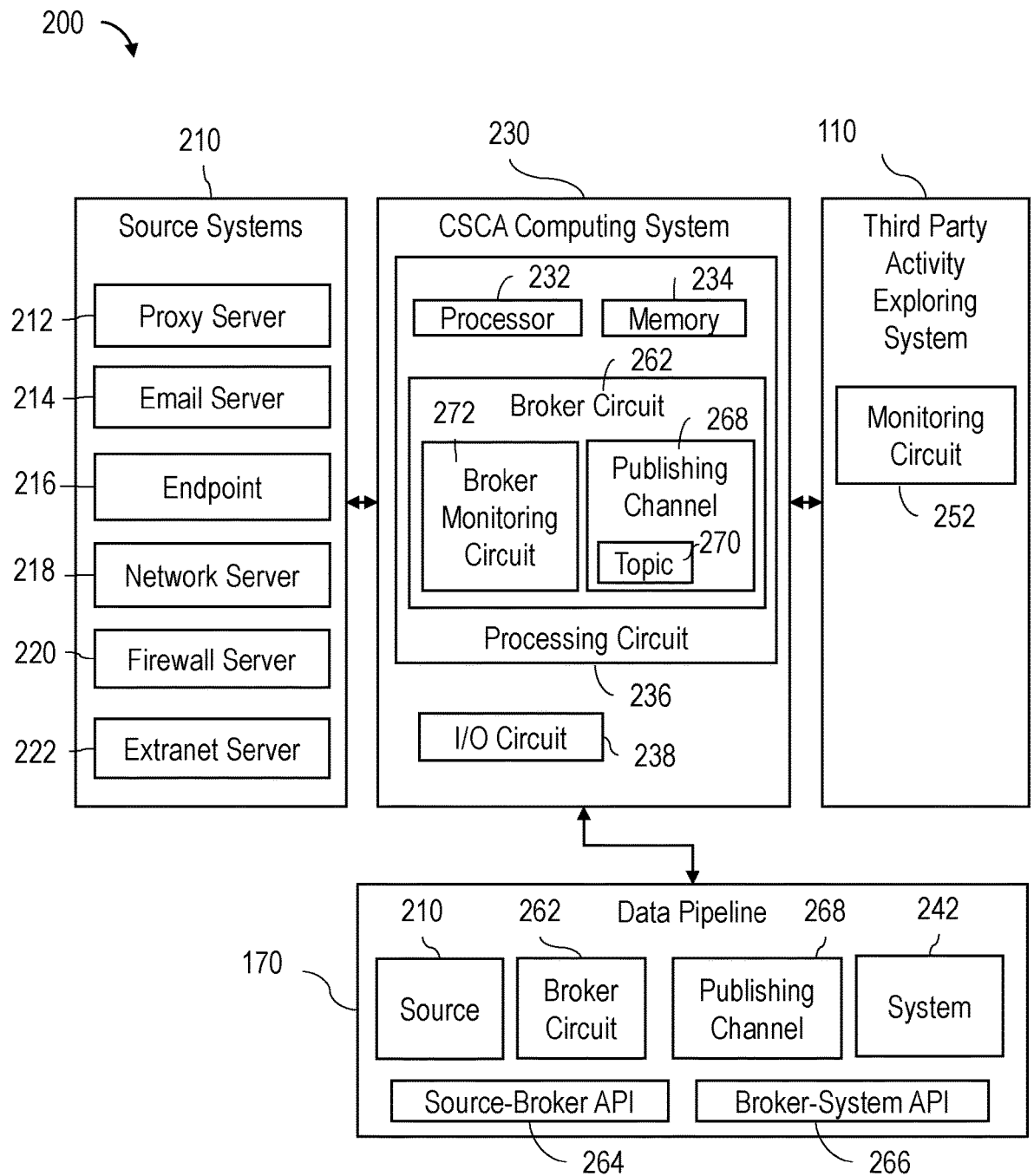
FIG. 2 is a block diagram depicting an example of a third party activity exploring system and computing environment, according to some arrangements.

Further with respect to the components of FIG. 1, the third party activity exploring system 110 can communicatively and operatively couple to the data pipeline 170, which is described in greater detail relative to FIG. 2. Generally, the data pipeline 170 enables the third party activity exploring system 110 to ingest and monitor third party activity data and denotes a route taken by a particular unit of information (e.g., from an external device, to a source computing system, and then, via a CSCA computing system, to a destination computing system). The third party activity data may include any items extracted from the header, footer, metadata, and/or payload portions of the data packets transmitted by the entity device(s) 140, 150, 160 over the network 130. In some arrangements, the third party activity data may be used to identify a particular entity device 140, 150, 160. For example, a particular device identifier may be extracted from the header, footer, metadata, and/or payload portion of the traffic packet(s) and may include all or a portion of a cookie, a unique code, an IP address, a MAC address, a VLAN identifier, domain, subdomain, or another suitable identifier. In some arrangements, the third party activity data may be used to identify a particular user associated with the entity device 140, 150, 160. For example, a particular user identifier may be extracted from the header, footer, metadata, and/or payload portion of the traffic packet(s) and may include all or a portion of a cookie, a unique code, a public/private key, a user name, an active directory handle, a social media handle, an email address, a financial account identifier, or another suitable identifier. In some arrangements, the third party activity data may be used to identify specific actions executed by entity device 140, 150, 160 automatically or by the particular user(s). For example, a particular item may be extracted from the header, footer, metadata, and/or payload portion of the traffic packet(s) and may include all or a portion of a cookie, a unique code, bytes in, bytes out, a clear-text message, an email message, an image, a graphic, a video, an interface message, a source email address, a recipient email address, a timestamp, a file name, a file extension, or any other suitable information indicative of activity on a computing system.

Referring now to FIG. 2, a diagram of a computing environment 200, including an example data pipeline 170, is shown, according to an example arrangement. As shown, various components of the computing environment 200 form the data pipeline 170. According to various arrangements, the data pipeline 170 enables monitoring of activity on or by devices (e.g., the entity devices 140, 150, 160 of FIG. 1) via the source systems 210. More specifically, the data pipeline 170 can enable various entities (such as the organization device 190 of FIG. 1) to engage in subscription-based third party activity data dissemination and monitoring. In some arrangements, third party activity data pertains to various user-driven events on monitored systems/devices and, accordingly, generating and transmitting third party activity data via the data pipeline 170 is an event-driven process. Examples of events may include user-initiated events, such as sending an email or uploading a file, and system-initiated events, such as an automatic call to an executable that resides on the organization's web server. In some arrangements, the data is static rather than event-driven, and events may be used to capture this additional static data. For instance, the systems described herein may detect that otherwise authorized activity on an organization's extranet is performed by an unauthorized (e.g., unknown, previously unregistered) device.

In an example arrangement, the data pipeline 170 is structured according to a source-broker-system model for identifying and monitoring third party activity data. For example, the computer-executable operations enabled by the data pipeline 170 may include receiving, by the CSCA computing system 230, from the source system(s) 210, third party activity data. The data may be ingested by the broker monitoring circuit 272 structured to continuously or periodically monitor the source system(s) for updates. In some arrangements, the source system(s) 210 may periodically or in substantially real-time update and output a log file comprising third party activity data. The broker monitoring circuit 272 may be pre-configured to access the log file (e.g., via a source-broker API 264) and publish the log file, in whole or in part, via the publishing channel 268. In some arrangements, rather than or in addition to monitoring log files, the broker monitoring circuit 272 may be structured to monitor and/or capture network traffic activity information (e.g., in summary form, in packet form, in modified packet form, etc.) and publish the information, in whole or in part, via the publishing channel 268. In some arrangements, the entirety of the log file and/or traffic activity information may be published unmodified. In some arrangements, the input data may be modified, summarized, averaged, cleansed, transformed, etc. prior to being published. The published data may be organized into topics 270. According to various arrangements, the topic identifiers can include any suitable elements of the third party activity data or a combination thereof. For instance, in an example arrangement, the third party activity data may be grouped by the device identifier of the source system 210. Accordingly, the third party activity exploring system 110 can subscribe to particular topics 270.

Referring now to the components of FIG. 2 in more detail, the computing environment 200 is shown to include various source systems 210, a CSCA computing system 230, and a third party activity exploring system 110.

The source systems 210 can include hardware, software and/or circuitry that originates, generates and/or routes third party activity data for a particular monitored device to the CSCA computing system 230, which then performs operations related to detecting third party activity and provides the output of these operations to the third party activity exploring system 110. The source systems 210 can include any of a proxy server 212, an email server 214, an endpoint 216, a network server 218, a firewall server 220, and an extranet server 222. In operation, these components can provide various connectivity data to the third party activity exploring system 110 through the processes herein. For instance, the proxy server 212 may be configured to transmit web and/or proxy data (e.g., IP address, any item included in the header, footer, and/or payload of the outbound Web packet data, etc.) of one or more entity devices 140, 150, 160. The email server 214 may be configured to transmit email data (e.g., email control logs, Proofpoint, FireEye, etc.) of one or more entity devices 140, 150, 160. The endpoint 216 may be configured to transmit endpoint data (e.g., Tanium data, SEP data, etc.) of one or more entity device(s) 140, 150, 160. In some arrangements, the entity device(s) are considered monitored endpoints. In some arrangements, the entity device(s) are communicatively coupled to an endpoint. Accordingly, both use cases are contemplated herein. The network server 218 may be configured to transmit network data of one or more entity devices 140, 150, 160 (e.g., VPN data, access to VPN data such as user information, etc.). The firewall server 220 may be configured to transmit firewall data (e.g., whether an activity was allowed and/or blocked via a firewall, IPS/IDS data, Anomaly detection data, netflow data, etc.) of one or more entity devices 140, 150, 160. The extranet server 222 may be configured to transmit extranet data of one or more entity devices 140, 150, 160. The source systems 210 can provide streams of data (e.g., third party activity data) to the CSCA computing system 230 through the source-broker API 264. [OAA1]

The CSCA computing system 230 can include hardware, software and/or circuitry structured to perform computer-executable operations for sourcing third party activity data. As shown, the CSCA computing system 230 includes a processor 232, a memory 234, a processing circuit 236, and an input-output circuit 238. The processor 232 may be implemented as a general-purpose processor, an application specific integrated circuit (ASIC), one or more field programmable gate arrays (FPGAs), a digital signal processor (DSP), a group of processing components, or other suitable electronic processing components. The memory 234 may be or include tangible, non-transient volatile memory and/or non-volatile memory. The input-output circuit 238 is structured to receive communications from and provide communications to the user. The processing circuit 236 is structured to execute various computer-based operations stored in the memory 234.

As shown, the processing circuit 236 includes a broker circuit 262. The broker circuit 262 mediates the many-to-many relationship of the source systems 210 to the third party activity exploring system 110 via the publishing channel 268 structured to receive electronic messages and then stream these messages via topics 270. In an example arrangement, the broker circuit 262 includes a broker monitoring circuit 272 and a publishing channel 268. The a broker circuit 262 receives data, via the source-broker API 264, from one or more source systems 210 and distributes data, via the broker-system API 266, to the third party activity exploring system 110 (e.g., a user of one or more of the organization devices 190 of FIG. 1). The source-broker API 264 and/or the broker-system API 266 may include hardware infrastructure, memory and/or executables that embody a synchronous (e.g., event-based) or asynchronous (e.g., batch) interface engine between the respective systems. Although Apache Kafka and its XML- and Java-based APIs were used in an example arrangement, other suitable implementation infrastructures are also contemplated. In operation, the broker monitoring circuit 272 and/or the monitoring circuit 252 are structured to perform operations substantially similar to those described with respect to their counterpart monitoring circuit 114 of FIG. 1. The computer-executable logic embodied by these circuits may be built into the broker circuit 262 and/or offloaded, at least in part, to the third party activity exploring system 110. Accordingly, in one example arrangement, the broker monitoring circuit 272 is structured to receive third party activity data and perform operations substantially similar to those described with respect to its counterpart monitoring circuit 114 of FIG. 1 and then publish the resulting data (e.g., user data merge results, transformed data, summary data, extracted data, etc.) to the publishing channel 268, where it is accessible by one or more controllers of the third party activity exploring system 110. In another example arrangement, the publishing channel 268 is structured to receive data (e.g., unmerged third party activity data) directly from the source systems 210. In this scenario, one or more users of the third party activity exploring system 110 further perform operations for monitoring behavior of third party entities, by the monitoring circuit 252, on the raw third party activity data received via the publishing channel 268.

Further in relation to the publishing channel 268, the publishing channel 268 can include hardware, circuitry, and/or storage media structured to receive and stream computer-based electronic messages. Accordingly, in some arrangements, the publishing channel 268 may include a data set or a queue of electronic messages. The electronic messages may represent event-based instances of third party activity data.

Figure 3:
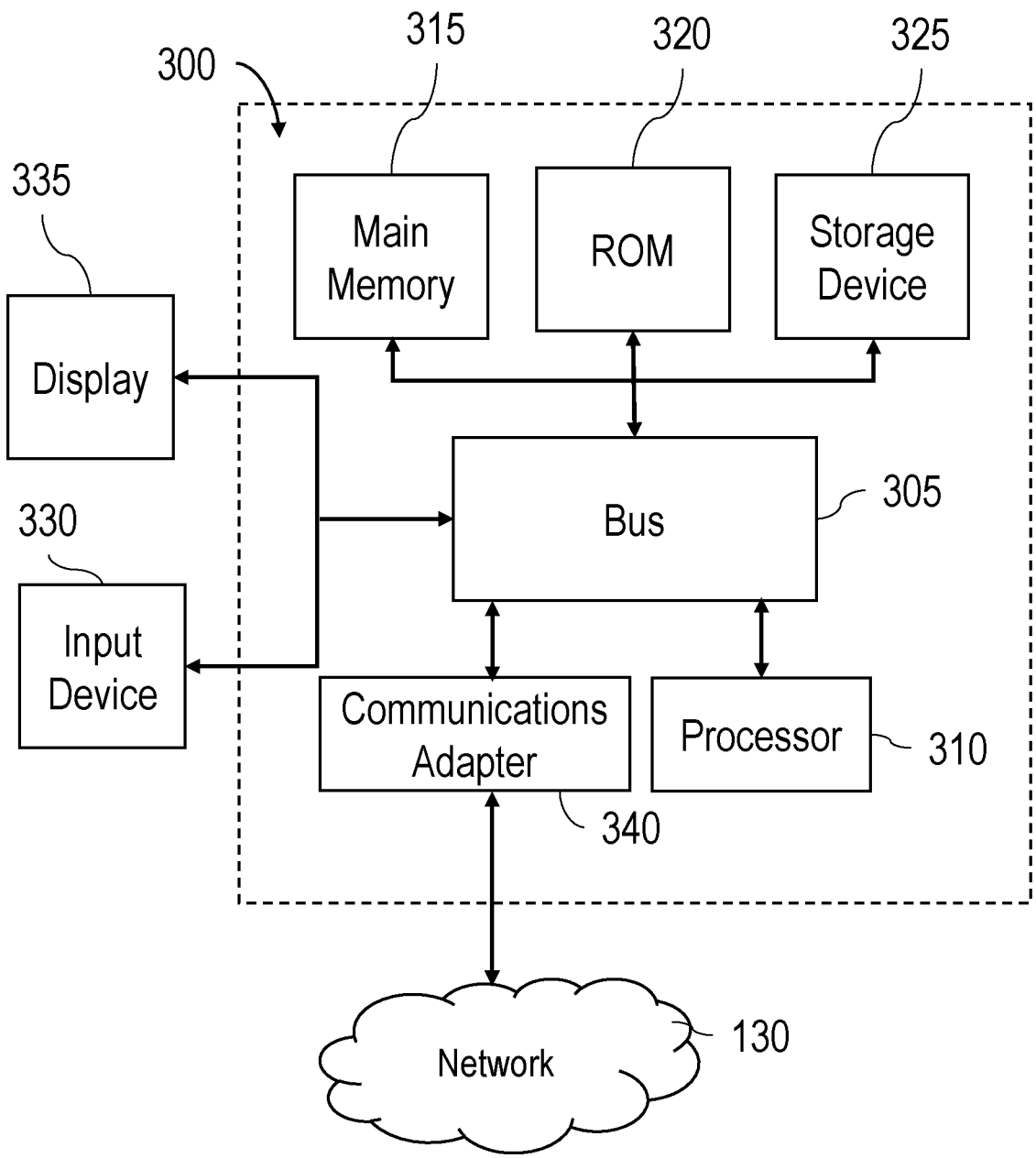
FIG. 3 is a block diagram illustrating an example computing system suitable for use in the various arrangements described herein.

Referring now to FIG. 3, a depiction of a computer system 300 is shown. The computer system 300 that can be used, for example, to implement a computing environment 100, third party activity exploring system 110, entity devices 140, 150, 160, data pipeline 170, and/or various other example systems described in the present disclosure. The computing system 300 includes a bus 305 or other communication component for communicating information and a processor 310 coupled to the bus 305 for processing information. The computing system 300 also includes main memory 315, such as a random-access memory (RAM) or other dynamic storage device, coupled to the bus 305 for storing information, and instructions to be executed by the processor 310. Main memory 315 can also be used for storing position information, temporary variables, or other intermediate information during execution of instructions by the processor 310. The computing system 300 may further include a read only memory (ROM) 320 or other static storage device coupled to the bus 305 for storing static information and instructions for the processor 310. A storage device 325, such as a solid-state device, magnetic disk or optical disk, is coupled to the bus 305 for persistently storing information and instructions.

The computing system 300 may be coupled via the bus 305 to a display 335, such as a liquid crystal display, or active matrix display, for displaying information to a user. An input device 330, such as a keyboard including alphanumeric and other keys, may be coupled to the bus 305 for communicating information, and command selections to the processor 310. In another arrangement, the input device 330 has a touch screen display 335. The input device 330 can include any type of biometric sensor, a cursor control, such as a mouse, a trackball, or cursor direction keys, for communicating direction information and command selections to the processor 310 and for controlling cursor movement on the display 335.

In some arrangements, the computing system 300 may include a communications adapter 340, such as a networking adapter. Communications adapter 340 may be coupled to bus 305 and may be configured to enable communications with a computing or communications network 130 and/or other computing systems. In various illustrative arrangements, any type of networking configuration may be achieved using communications adapter 340, such as wired (e.g., via Ethernet), wireless (e.g., via Wifi, Bluetooth), satellite (e.g., via GPS) pre-configured, ad-hoc, LAN, WAN.

According to various arrangements, the processes that effectuate illustrative arrangements that are described herein can be achieved by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement may also be employed to execute the instructions contained in main memory 315. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 3, arrangements of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 3 as singular, stand-alone devices, one of ordinary skill in the art will appreciate that, in some arrangements, the computing system 300 may comprise virtualized systems and/or system resources. For example, in some arrangements, the computing system 300 may be a virtual switch, virtual router, virtual host, virtual server. In various arrangements, computing system 300 may share physical storage, hardware, and other resources with other virtual machines. In some arrangements, virtual resources of the network 130 (e.g., network 130 of FIG. 1) may include cloud computing resources such that a virtual resource may rely on distributed processing across more than one physical processor, distributed memory, etc.

Figure 4:
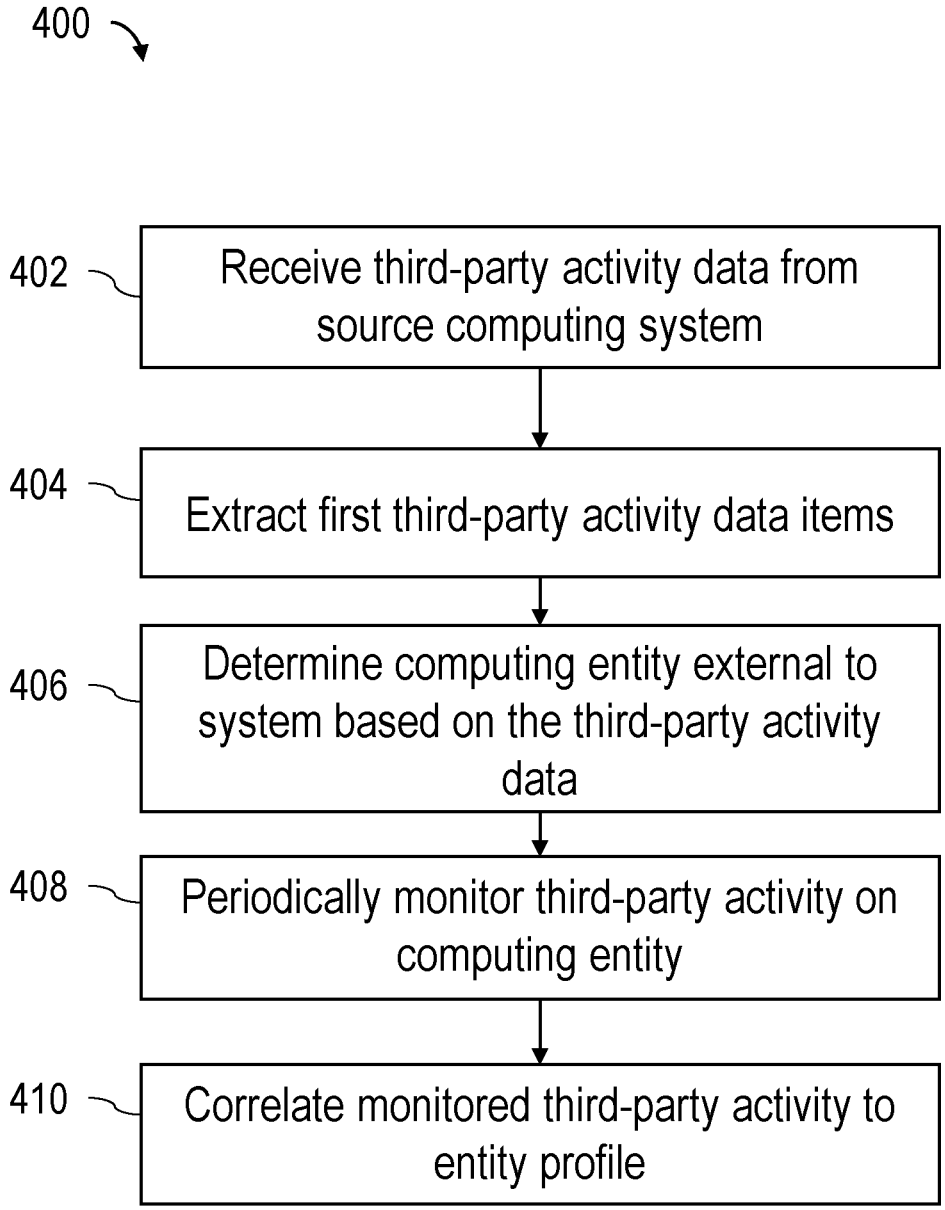
FIG. 4 is a flowchart for a method of managing third party activity data, according to some arrangements.

Referring now to FIG. 4, a flowchart for a method 400 of monitoring, storing, and correlating third party activity data is shown, according to some arrangements. Various components of the third party activity exploring system 110 and computing environment 100 may be configured to perform method 400.

In broad overview of method 400, at block 402, the one or more processing circuits (e.g., third party activity exploring system 110 in FIG. 1, computing system 300 in FIG. 3) receive third party activity from a source. At block 404, one or more processing circuits extract the connectivity data. At block 406, one or more processing circuits determine a computing entity (e.g., the entity devices 140, 150, 160) external to the system (e.g., external to the third party activity exploring system 110). At block 408, one or more processing circuits periodically monitor third party activity on the computing entity. At block 410, one or more processing circuits correlate the monitored third party activity to an entity profile. Additional, fewer, or different operations may be performed depending on the particular arrangement. In some arrangements, some or all operations of method 400 may be performed by one or more processors executing on one or more computing devices, systems, or servers. In various arrangements, each operation may be re-ordered, added, removed, or repeated.

Referring to method 400 in more detail, at block 402, the one or more processing circuits (e.g., the entity manager 112 of the third party activity exploring system 110 in FIG. 1, computing system 300 in FIG. 3) receive third party activity from a source (e.g., the source systems 210 in FIG. 2) via the data pipeline 170. The third party activity data may include any of web and/or proxy data from a proxy server 212, email data from an email server 214, endpoint data from an endpoint 216, network data from a network server 218, firewall data from a firewall server 220, and/or extranet data from an extranet server 222. In some arrangements, the third party activity data received via the data pipeline 170 may be associated with one or more computing entities external to the third party activity exploring system 110 (e.g., one or more entity devices 140, 150, 160). According to some arrangements, the third party activity data may be associated with third party activity on the various computing entities.

Referring to method 400 in more detail, at block 404, the one or more processing circuits (e.g., the entity manager 112 of the third party activity exploring system 110, computing system 300 in FIG. 3) extracts the third party activity data. For example, the entity manager may extract the third party activity data described above to determine entity data associated with a third party entity of each entity device, wherein the entity data includes subsets of data associated with specific data channels or data sources. Each data channel of the plurality of data channels may be communicatively connected to the one or more processing circuits via the data pipeline 170. In various arrangements, the entity data of an entity can contain items such that a plurality of items can be included in the subsets of data. In some arrangements, each data channel may include a subset of data such that the entity data can be subsets of data. For example, subsets of data can include properties extracted from third party activity data and/or packet segments extracted from IP traffic data. The one or more processing circuits can also analyze network properties and network information of a target computer network environment associated with the entity. Further, the one or more processing circuits can also collect entity data by querying a plurality of data sources (e.g., the source systems 210 in FIG. 2). In some arrangements, analyzing network properties and network information of a target computer network environment associated with the entity can be based on evaluating domain and subdomain Internet protocol (IP) traffic and/or based on additional relevant intelligence data collected internally or via third party systems.

Referring to method 400 in more detail, at block 406, the one or more processing circuits (e.g., the entity manager 112 of the third party activity exploring system 110, the computing system 300 in FIG. 3) determines the computing entity external to the third party activity exploring system 110. For example, the entity manager 112 may assign each logged third party activity data to a corresponding entity device (e.g., of the entity devices 140, 150, 160) based on various rules, properties, and/or identifiers. For example, as described above, the entity manager 112 of the third party activity exploring system 110 may determine an associated entity device 140, 150, 160 based on a unique identifier (e.g., cookie, code, domain IP address, etc.) associated and received with each third party activity data. As described above, in some arrangements, the entity may be an unknown entity. In such scenarios, the systems, methods and non-transitory computer-readable media described herein may be operable to identify the new, unknown entity, log the appropriate entity identifier(s) (i.e., domain identifier, subdomain identifier, email address, file name, IP address, etc.) and initiate periodic monitoring of third party activity associated with the new entity. For example, the unknown entity may be a new vendor of a financial institution. In such a case, the one or more processing circuits may identify the unknown vendor (e.g., by receiving or determining a unique identifier associated with the unknown vendor in which the unique identifier is not currently related to a previously known entity). The one or more processing circuits may log the identifiers (e.g., a domain identifier associated with the new vendor) and may monitor third party activity associated with the unknown vendor. For example, the one or more processing circuits may periodically monitor when an individual of the unknown vendor accesses a VPN of the financial institution (e.g., through an entity device).

Referring to method 400 in more detail, at block 408, the one or more processing circuits (e.g., the monitoring circuit 114 of the third party activity exploring system 110, the computing system 300 in FIG. 3) periodically monitors third party activity on each identified one or more computing entities (e.g., entity devices 140, 150, 160). For example, in some arrangements, the data pipeline 170 transmits the third party activity data from the source systems 210 to the third party activity exploring system 110 continuously (e.g., in real-time). In some arrangements, the data pipeline 170 transmits the third party activity data from the source system 210 to the third party activity exploring system 110 in increments (e.g., every minute, every hour, every day, every week).

The one or more processing circuits may determine a device identifier based on first user activity data (e.g., any user activity data described herein). The one or more processing circuits may subscribe to a topic 270 on a publishing channel 268 of the CSCA computing system 230 (e.g., where the topic 270 includes the device identifier). The one or more processing circuits may receive, via the publishing channel 268, second user activity data (e.g., second user activity data at a different time period than the first user activity data). The one or more processing circuits may extract at least one item from the second user activity data. In some arrangements, the one or more processing circuits may correlate the item to a system of records (SOR) to determine whether the item is compliant. The one or more processing circuits may generate a notification upon determining whether the item is compliant. In some arrangements, the one or more processing circuits may generate a dashboard including the second user activity data, where the dashboard is accessible via an entity profile identifier for the correlated entity profile. In some arrangements, the one or more processing circuits may determine whether an entity profile exists for the device identifier. In response to determining that the entity profile does not exist, the one or more processing circuits may generate a notification.

For example, the one or more processing circuits may determine a device identifier corresponding to user activity of a known vendor of a financial institution (e.g., a user of an entity device of the vendor accessing an extranet of the financial institution on one day for 3 hours). The one or more processing circuits may subscribe to a topic on a publishing channel of the CSCA system in which the topic includes the device identifier. The one or more processing circuits may receive a second user activity via the publishing channel (e.g., the user of the entity device of the vendor accessing the extranet one a second day for 5 hours). The one or more processing circuits may extract one or more items from the second user activity data. For example, the one or more processing circuits may extract data from the second user activity data to determine what extranet data the user of the entity device of the vendor has access to (e.g., emails, files, how much data they have received and/or sent out, a risk score associated with the users and/or with the entity, how frequent the user activity is, etc.). The one or more processing circuits may generate a dashboard including at least one of the first user activity data or the second user activity data. For example, the dashboard may include a report shown on a user interface of the determined entity (e.g., the vendor), the users (e.g., users of the extranet from the vendor), and/or specific data corresponding the user activities (e.g., the amount of time each user accessed the extranet, the date the users accessed the extranet, what data the user had access to, the risk score associated with each user and/or with the vendor, etc.)

Referring to method 400 in more detail, at block 410, the one or more processing circuits (e.g., the monitoring circuit 114 of the third party activity exploring system 110, the computing system 300 in FIG. 3) correlates the monitored third party activity to an entity profile. In some arrangements, the monitoring circuit 114 (and/or a reporting engine 116 and interface manager 118) of the third party activity exploring system 110 may correlate or analyze the periodically monitored data to automatically link each data point to a predetermined entity profile (e.g., of a vendor). In some arrangements, the monitoring circuit 114 (and/or a reporting engine 116 and interface manager 118) of the third party activity exploring system 110 may store and/or compare each entity profile to a predetermined entity profile in a database 180 and/or a system of record. For example, the one or more processing circuits may subscribe to a topic 270 on a publishing channel 268 of the CSCA computing system 230 including a device identifier corresponding to an entity. The one or more processing circuits may receive, via the publishing channel 268, user activity data associated with the device identifier. The one or more processing circuits may extract at least one item from the user activity data and may correlate the item to a system of records (SOR) to determine whether the item is compliant (e.g., whether the user activity is considered normal for the entity). In some arrangements, the one or more processing circuits may determine whether an entity profile exists for the device identifier. For example, in some arrangements, the device identifier may not correspond to a previously known entity. In response to determining that the entity profile does not exist, the one or more processing circuits may generate a notification.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A third party data management system, comprising:
a processing circuit configured to:
receive, from a source computing system and via a cybersecurity correlation and analytics computing system, first third party activity data;
extract an identifier from the first third party activity data, wherein the identifier is extracted from at least one of a header, footer, metadata, or payload portion of a traffic packet;
correlate the identifier to at least a portion of an item of an entity profile;
based on the item extracted from the first third party activity data, determine a computing entity external to the third party data management system associated with the first third party activity data and the identifier;
periodically monitor third party activity on a plurality of data channels associated with the computing entity, comprising operations to collect second third party activity data, wherein the computing entity is communicatively coupled to the source computing system, and wherein the operations to collect comprise querying or accessing the plurality of data channels; and
correlate the monitored second third party activity data to an entity profile.

2. The third party data management system of claim 1, wherein the computing entity comprises the source computing system.

3. The third party data management system of claim 1, wherein the source computing system is at least one of a proxy server, an email server, an endpoint, a network server, a firewall server, or an extranet server.

4. The third party data management system of claim 1, wherein the processing circuit is communicatively coupled to a database comprising a system of records retrievably storing a plurality of data points associated with a plurality of third party entities, and wherein at least one in the plurality of data points represents a policy associated with the monitored third party activity, the processing circuit being further configured to correlate the monitored third party activity to the policy.

5. The third party data management system of claim 1, wherein the processing circuit is further configured to identify an unknown computing entity external to the third party data management system associated with the first third party activity data, comprising operations to:
   wherein the identifier comprises at least one of a cookie, a unique code, a public/private key, a user name, an active directory handle, a social media handle, an email address, and a financial account identifier;
   wherein correlating comprises cross-reference the identifier to at least the portion of the item extracted from the entity profile; and
   based on the cross-referencing, determine that the identifier does not match any records in the entity profile.

6. The third party data management system of claim 5, wherein the processing circuit is further configured to:
   generate a notification comprising the identifier; and
   transmit the notification to an administrator associated with the entity profile.

7. The third party data management system of claim 1, wherein the processing circuit is further configured to generate a user interface comprising a graphical representation of the entity profile.

8. A method of managing third party data, comprising:
   receiving, by a processing circuit of a third party data management system, first third party activity data from a source computing system and via a cybersecurity correlation and analytics computing system;
   extracting, by the processing circuit of the third party data management system, an identifier from the first third party activity data, wherein the identifier is extracted from at least one of a header, footer, metadata, or payload portion of a traffic packet;
   correlating, by the processing circuit of the third party data management system, the identifier to at least a portion of an item of an entity profile;
   determining, by the processing circuit of the third party data management system, a computing entity external to the third party data management system associated with the first third party activity data based on the item extracted from the first third party activity data and the identifier;
   monitoring, periodically by the processing circuit of the third party data management system, third party activity on a plurality of data channels associated with the computing entity, comprising operations to collect second third party activity data, wherein the computing entity is communicatively coupled to the source computing system, and wherein the operations to collect comprise querying or accessing the plurality of data channels; and
   correlating, by the processing circuit of the third party data management system, the monitored second third party activity data to an entity profile.

9. The method of claim 8, wherein the computing entity comprises the source computing system.

10. The method of claim 8, wherein the computing entity is communicatively coupled to the source computing system.

11. The method of claim 8, wherein the source computing system is at least one of a proxy server, an email server, an endpoint, a network server, a firewall server, or an extranet server.

12. The method of claim 8, wherein the processing circuit is communicatively coupled to a database comprising a system of records retrievably storing a plurality of data points associated with a plurality of third party entities, and wherein at least one in the plurality of data points represents a policy associated with the monitored third party activity, the processing circuit being further configured to correlate the monitored third party activity to the policy.

13. The method of claim 8, wherein the processing circuit is further configured to identify an unknown computing entity external to the third party data management system associated with the first third party activity data, comprising:
   wherein the identifier comprises at least one of a cookie, a unique code, a public/private key, a user name, an active directory handle, a social media handle, an email address, and a financial account identifier;
   wherein correlating comprises cross-referencing the identifier to at least the portion of the item extracted from the entity profile; and
   based on the cross-referencing, determining that the identifier does not match any records in the entity profile.

14. The method of claim 13, wherein the processing circuit is further configured to perform operations comprising:
   generating a notification comprising the identifier; and
   transmitting the notification to an administrator associated with the entity profile.

15. One or more non-transitory computer readable media storing instructions that, when executed by a processor, causes the processor to perform operations for managing third party data, the operations comprising:
   receiving, by a processing circuit of a third party data management system, first third party activity data from a source computing system and via a cybersecurity correlation and analytics computing system;
   extracting, by the processing circuit of the third party data management system, an identifier from the first third party activity data, wherein the identifier is extracted from at least one of a header, footer, metadata, or payload portion of a traffic packet;
   correlating, by the processing circuit of the third party data management system, the identifier to at least a portion of an item of an entity profile;
   determining, by the processor of the third party data management system, the first third party activity data;
   determining, by the processing circuit of the third party data management system, a computing entity external to the third party data management system associated with the first third party activity data based on the item extracted from the first third party activity data and the identifier;
   monitoring, periodically by the processing circuit of the third party data management system, third party activity on a plurality of data channels associated with the computing entity, comprising operations to collect second third party activity data, wherein the computing entity is communicatively coupled to the source computing system, and wherein the operations to collect comprise querying or accessing the plurality of data channels; and correlating, by the processing circuit of the third party data management system, the monitored second third party activity data to an entity profile.

16. The one or more non-transitory computer readable media of claim 15, wherein the computing entity comprises the source computing system.

17. The one or more non-transitory computer readable media of claim 15, wherein the computing entity is communicatively coupled to the source computing system.

18. The one or more non-transitory computer readable media of claim 15, wherein the source computing system is at least one of a proxy server, an email server, an endpoint, a network server, a firewall server, or an extranet serve.

19. The one or more non-transitory computer readable media storing instructions of claim 15, wherein the processing circuit is communicatively coupled to a database comprising a system of records retrievably storing a plurality of data points associated with a plurality of third party entities, and wherein at least one in the plurality of data points represents a policy associated with the monitored third party activity, the processing circuit being further configured to correlate the monitored third party activity to the policy.

\* \* \* \* \*